No. 687,886. Patented Dec. 3, 1901.
J. JOHENGEN & E. A. FEDICK.
POTATO PLANTER.
(Application filed Dec. 29, 1900.)
(No Model.) 3 Sheets—Sheet 1.
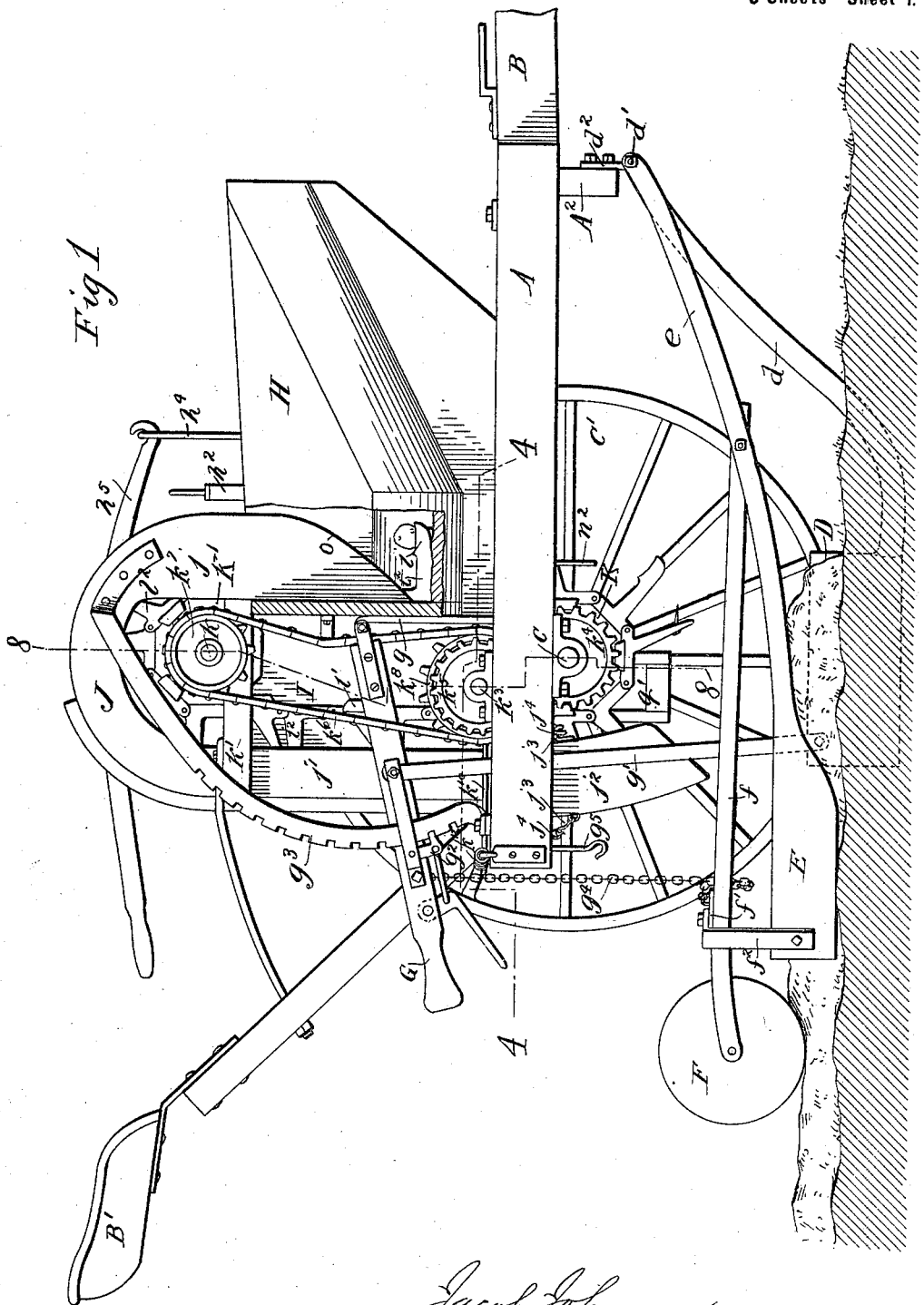

No. 687,886. Patented Dec. 3, 1901.
J. JOHENGEN & E. A. FEDICK.
POTATO PLANTER.
(Application filed Dec. 29, 1900.)
(No Model.) 3 Sheets—Sheet 2.
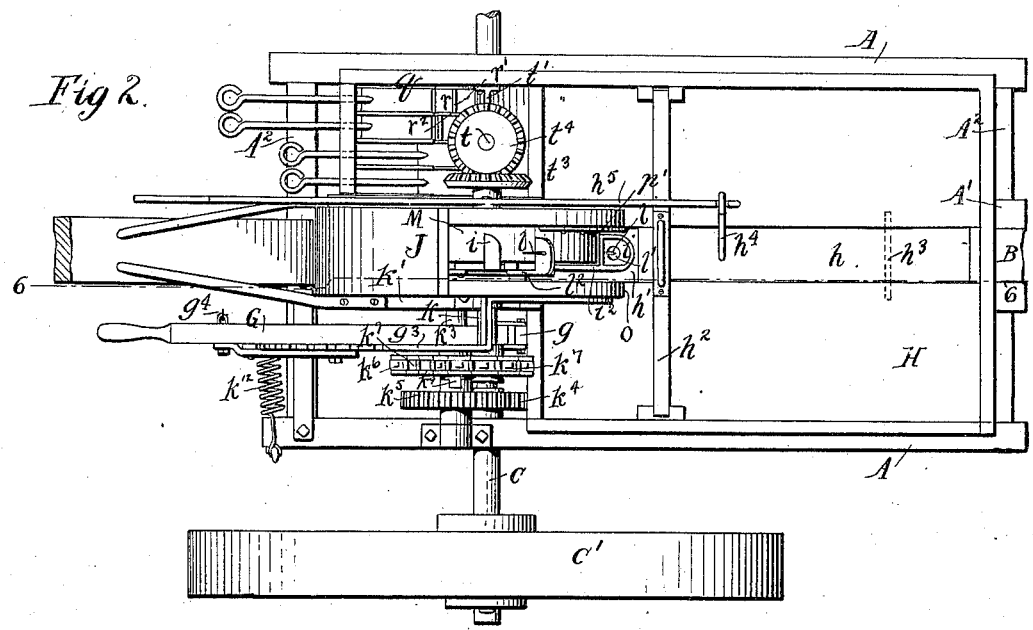
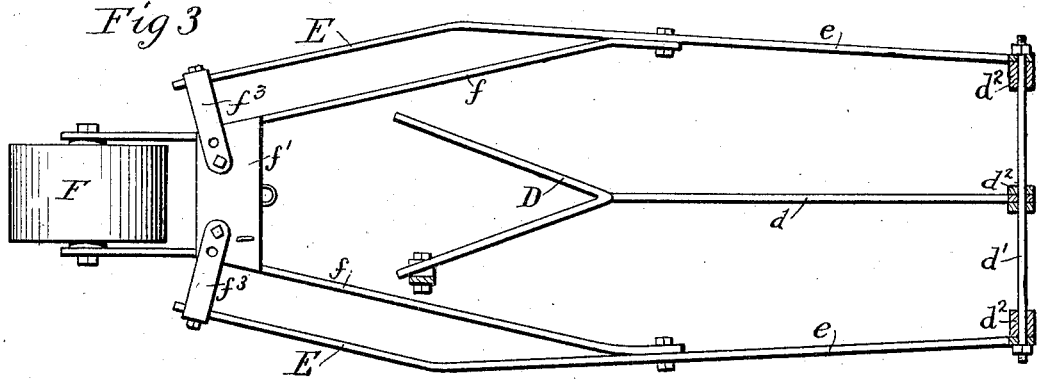
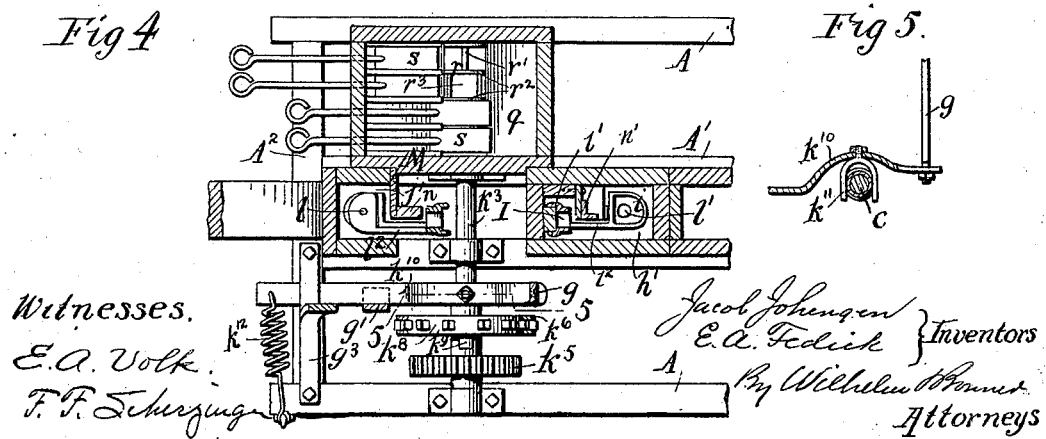
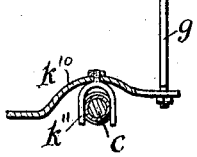
Witnesses.
E. A. Volk
F. F. Schurjung
Jacob Johengen
E. A. Fedick } Inventors
By Wilhelm Bonner
Attorneys

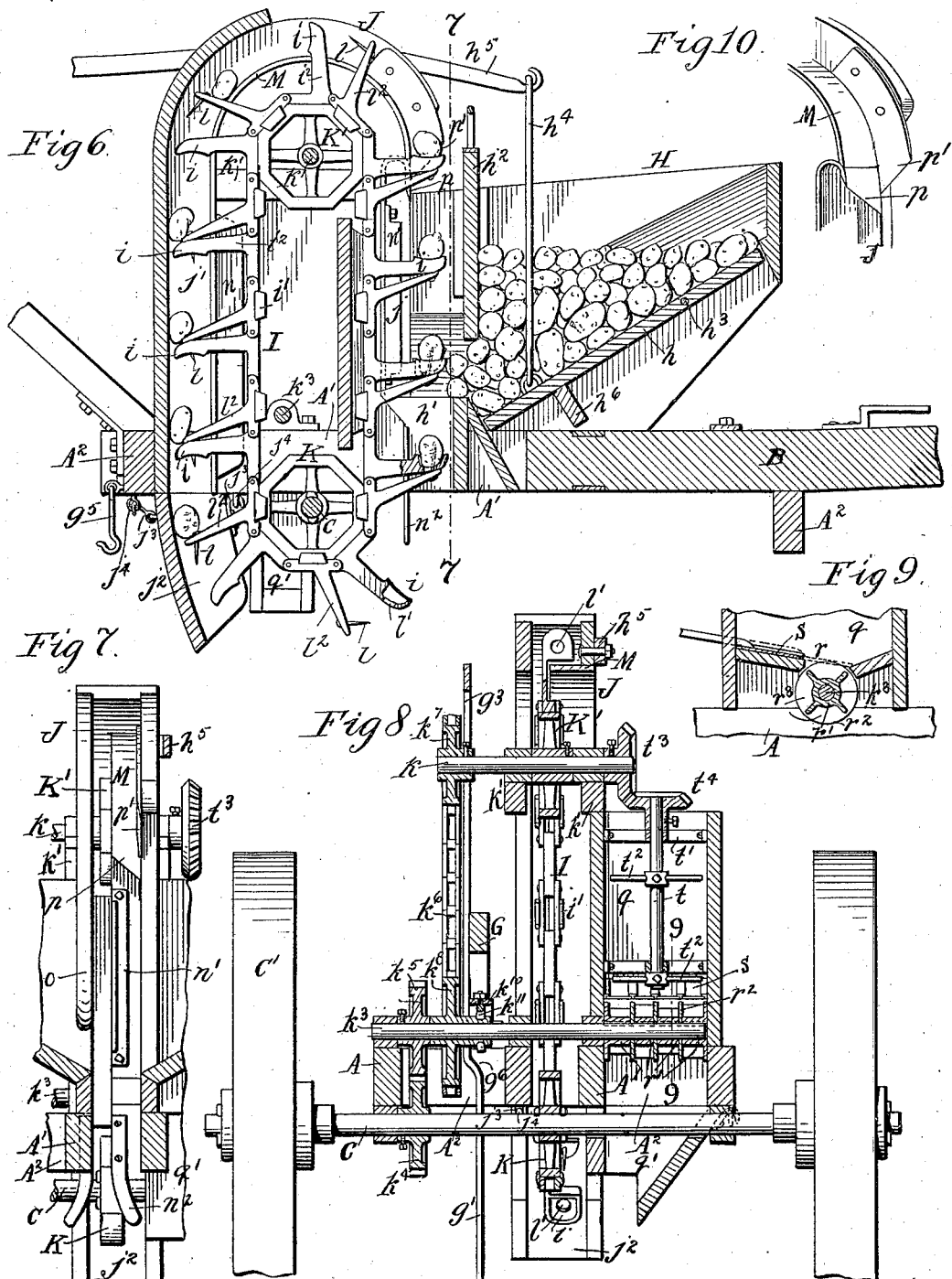

UNITED STATES PATENT OFFICE.

JACOB JOHENGEN AND EDWARD A. FEDICK, OF HAMBURG, NEW YORK.

POTATO-PLANTER.

SPECIFICATION forming part of Letters Patent No. 687,886, dated December 3, 1901.

Application filed December 29, 1900. Serial No. 41,531. (No model.)

*To all whom it may concern:*

Be it known that we, JACOB JOHENGEN and EDWARD A. FEDICK, citizens of the United States, and residents of Hamburg, in the county of Erie and State of New York, have invented new and useful Improvements in Potato-Planters, of which the following is a specification.

This invention relates more particularly to that class of potato-planters which comprise a plow, a potato-hopper, an elevator which receives the potatoes from the hopper and delivers the same into the furrow made by the plow, and devices for returning the displaced earth into the furrow for covering the potatoes.

The object of our invention is to improve the elevating and covering devices with a view of delivering the potatoes one at a time and planting the same at uniform intervals.

In the accompanying drawings, consisting of three sheets, Figure 1 is a side elevation of our improved potato-planter, the near wheel being removed and a portion of the potato-hopper broken away. Fig. 2 is a fragmentary top plan view of the machine, partly in section. Fig. 3 is a top plan view, partly in section, of the plow, the covering-shovels, the presser-roller, and the supporting-arms of these parts. Fig. 4 is a horizontal section in line 4 4, Fig. 1. Fig. 5 is a vertical longitudinal section in line 5 5, Fig. 4, showing the clutch-lever. Fig. 6 is a similar section in line 6 6, Fig. 2. Fig. 7 is a fragmentary transverse section in line 7 7, Fig. 6, looking rearwardly, the potato-elevator being omitted. Fig. 8 is a similar section in line 8 8, Fig. 1. Fig. 9 is a fragmentary longitudinal section of the fertilizer-hopper in line 9 9, Fig. 8. Fig. 10 is a fragmentary perspective view of the cutters for severing large pototoes.

Like letters of reference refer to like parts in the several figures.

The frame of the machine is composed of horizontal side bars A, intermediate longitudinal bars A', and cross-pieces A², connecting the ends of said side and intermediate bars.

B is the tongue or pole, secured to the front cross-piece A², and B' the driver's seat, mounted on the rear portion of the frame.

C is the axle on which the frame of the machine is supported and to the ends of which the ground-wheels C' are secured, so that the axle turns therewith. The axle is arranged below the side bars A and journaled in suitable bearings secured to the under side thereof.

D is a plow of any suitable construction, which is preferably arranged under the axle C and which forms the furrow for receiving the potatoes. This plow is provided with a forwardly and upwardly extending draft-arm $d$, which is pivoted at its front end to a transverse rod $d'$, which latter is carried by hangers $d^2$, depending from the front portion of the main frame.

E E are a pair of covering shovels or scoops arranged in rear of the plow D on opposite sides of the path thereof and converging rearwardly, as shown in Fig. 3, so as to scoop the displaced earth inwardly and cover the potatoes dropped into the furrow. These covering-shovels are provided with forwardly-extending arms $e$, which are pivoted at their front ends to the transverse rod $d'$ independently of the plow-arm $d$, as shown in Figs. 1 and 3. This construction permits the covering-shovels to rise and fall independently of the plow in passing over knolls and to cover potatoes on knolls and in hollows as well as on level ground.

F is a presser-roller which is arranged in rear of the covering-shovels E and in line with the plow D and which packs down the ground turned into the furrow by said shovels. This roller is journaled between the rear ends of a pair of arms $ff$, secured at their front ends to the arms $e$ of the covering-shovels and connected near their rear ends by a cross-bar or plate $f'$. The rear ends of the covering-shovels are connected with the supporting-arms $f$ of the presser-roller by brackets $f^2$, provided at their upper ends with inwardly-extending lips $f^3$, which are secured to the cross-bar $f'$, preferably adjustably, as shown in Figs. 1 and 3, so that the covering-shovels can be brought closer together or spread farther apart, if desired.

The plow D is raised or lowered for regulating the depth to which it enters the soil by a vertically-swinging hand-lever G, which is pivoted at its front end to a fixed standard $g$ and connected with the plow by a rod $g'$. This hand-lever is locked in any desired position by a suitable catch $g^2$, carried by the lever and engaging in one of a series of notches formed in a curved stationary segment $g^3$, as shown in Fig. 1. The presser-roller F and the covering-shovels E are connected with the hand-lever G by a chain $g^4$, secured at its lower end to the cross-bar $f'$, so that the plow, the covering-shovels, and the presser-roller can be raised and supported clear of the ground by said hand-lever in taking the machine to and from the field. To relieve this hand-lever from the weight of the covering-shovels and the presser-roller, the chain $g^4$ may be engaged with a hook $g^5$, secured to the main frame, after having raised the same by means of said hand-lever.

H is a potato-hopper mounted on the main frame of the machine and having its bottom $h$ inclined rearwardly and its sides inclined rearwardly and toward its bottom. This hopper is provided at its lower or delivery end with a vertical discharge-spout $h'$ and in front of said spout with a vertical slide or gate $h^2$ for regulating the discharge of the potatoes from the hopper. The bottom board $h$ of the hopper is preferably movable, so that it can be vibrated for facilitating the discharge of the potatoes. For this purpose the bottom board is mounted near its upper end on a horizontal pivot-pin $h^3$, and the free lower end thereof is connected by a rod $h^4$ with a hand-lever $h^5$, the handle of which terminates in convenient reach of the seat B'. The free end of the bottom board rests normally upon a cross-piece $h^6$ of the potato-hopper.

I is an upright elevator which is arranged in rear of the potato-hopper H and which receives the potatoes from the same. This elevator is arranged in a casing J and consists of an endless belt or chain provided with outwardly-projecting buckets or cups $i$, which are arranged to pass upwardly through the discharge-spout $h'$ of the potato-hopper and the ascending leg $j$ of the casing J and downwardly through the discharge-leg $j'$ of said casing, as shown in Figs. 1 and 6. The ascending leg $j$ of the elevator-casing is arranged in the potato-hopper H in rear of its slide $h^2$, and the rear leg $j'$ of the elevator-casing is arranged directly over the rear end of the plow D, so that the elevated potatoes are dropped into the furrow made by the plow. The elevator I extends some distance below the main frame, and the discharge-spout $j^2$ of the elevator-leg extends downwardly to within a short distance of the ground, so that the discharged potatoes fall a comparatively short distance, thereby preventing rolling of the potatoes and insuring a more even and regular planting of the same. In order to permit the removal of the spout $j^2$ and prevent breakage thereof in going to and from the field, said spout is removably attached to the main frame by hooks $j^3$ and eyes $j^4$ or other suitable means. (See Fig. 6.)

The elevator-chain I runs around guide-wheels K K', preferably of octagonal form, and the links of the elevator-chain are of about the same length as the flat faces of said wheels, so as to lie flat against the same in passing around the wheels. The chain-links are provided with inwardly-extending flanges $i'$, which retain the chain on the wheels. The lower guide-wheel K turns loosely on the axle C, while the upper guide-wheel K' is secured to a transverse shaft $k$, journaled in bearings mounted on fixed longitudinal supporting-bars $k'$, which are arranged on opposite sides of the elevator-casing.

$k^3$ is a transverse shaft arranged above the axle C and supported in bearings secured to the main frame. This shaft is driven from the axle by gear-wheels $k^4 k^5$, and the elevator I is in turn driven from the shaft $k^3$ by a sprocket-chain $k^6$, running around sprocket-wheels $k^7 k^8$, secured to said shafts, as shown in Figs. 1 and 8. The lower sprocket-wheel $k^8$ is preferably loose on its shaft, and its hub is provided with one or more clutch-teeth $k^9$, Fig. 4, which are adapted to engage in or be withdrawn from recesses formed in the hub of the adjacent gear-wheel $k^5$, so that the upper elevator-shaft $k$ may be thrown into and out of gear with the axle C. The loose sprocket-wheel $k^8$ is shifted laterally by a horizontally-swinging lever $k^{10}$, pivoted at one end to the lower end of the standard $g$, which is secured to the rear wall of the potato-hopper, as shown in Fig. 5. The lever $k^{10}$ is provided with a yoke $k^{11}$, having studs which engage in an annular groove formed in the hub of the loose sprocket-wheel $k^8$.

$k^{12}$ is a spring which is secured at one end to the free end of the clutch-lever $k^{10}$ and at its opposite end to the main frame and which tends to hold the loose sprocket-wheel $k^8$ in gear with the gear-wheel $k^5$. The rod $g'$, which connects the plow D with the hand-lever G, is preferably provided with a cam or inclined offset $g^6$, located normally below the clutch-lever $k^{10}$, so that when the plow is raised clear of the ground said cam engages against the clutch-lever and shifts the same inwardly, thereby throwing the elevator I out of gear with the axle in the act of raising the plow.

The elevator-cups $i$ extend outwardly in close proximity to the opposing wall of the elevator-casing J, so that the potatoes on the same cannot fall between the outer ends of the cups and said wall, and the elevator-casing is made so narrow that the potatoes cannot fall between its side walls and the sides of the cups. In order to reliably retain the potatoes on the ascending cups in planting on a sidehill, a movable impaling pin or needle $l$ is arranged to coöperate with each cup. This pin passes upwardly through an aperture $l'$ in the bottom of the cup and is mounted on the outer end of an arm $l^2$, projecting from the elevator-chain below the cup. In the construction shown in the drawings every other chain-link carries a potato-cup $i$, and each intermediate chain-link carries an impaling-pin $l$, so that these pins alternate with the cups. The arm of each impaling-pin is arranged obliquely and so as to extend upwardly and outwardly from the corresponding chain-link, so that when adjacent links of the chain are in line with each other on the ascending side of the elevator the outer ends of the pin-arms bear against the cups next above the same and their pins project through the apertures of the cups and above their bottom. When a potato drops upon a cup, it is pierced by the pin thereof, preventing the potato from rolling off the cup. The chain-links in passing around the upper and rear sides of the upper guide-wheel K' assume a position at an angle to each other, and this causes the arms of the impaling-pins to recede from their companion cups, as shown in Fig. 6, thereby withdrawing the pins from the apertures of the cups and releasing the potatoes. The pin-arms $l^2$ in passing forwardly around the lower guide-wheel K gradually approach the potato-cups, so that by the time the cups reach a horizontal position on the ascending side of the elevator the impaling-pins project through the apertures of the cups ready to receive and hold the potatoes.

M, Figs. 2, 4, 6, 7, and 8, is a guard arranged on the inner sides of the elevator-cups $i$ and extending upwardly and rearwardly from a point opposite the front side of the upper guide-wheel K' and thence downwardly on the rear side of said wheel nearly to the lower end of the rear leg $j'$ of the elevator-casing. This guard prevents the potatoes upon reaching the top of the elevator from dropping between the runs of the elevator-chain and compels the same to descend through the rear leg $j'$. The guard M is secured to one side of the elevator-casing and extends nearly from side to side of the potato-cups $i$, the arms $i^2$ of the latter being offset or arranged at one side of the cups to permit of this arrangement of the guard M, as shown in Figs. 4 and 8.

$n$ $n'$, Figs. 4, 6, and 7, are stationary upright guides arranged between the potato-cups $i$ and the runs of the elevator-chain I. These guides prevent deflection of the elevator-chain and keep the potato-cups out of contact with the walls of the elevator-casing.

$n^2$, Figs. 1, 6, and 7, represents a pair of downwardly-diverging guides arranged transversely at the lower end of the discharge-spout $h'$ of the potato-hopper for centering the potato-cups $i$ in ascending through said spout.

The supporting-arms $i^2$ of the potato-cups are comparatively narrow, so that potatoes cannot lodge thereon. In order to prevent more than one potato from remaining on a cup, a guard $o$ is arranged adjacent to one side of the ascending run of the elevator-chain I and above the discharge-spout $h'$ of the potato-hopper, so that in case a number of potatoes are fed upon a cup all but one of the same will be intercepted by the guard and pushed off the cup, while the other will roll into the middle of the cup. The guard $o$ is preferably formed by one of the side walls of the ascending leg $j'$ of the elevator-casing, the lower front edge of said wall being cut away obliquely, so as to recede downwardly, as shown in Fig. 1.

$p$, Figs. 6, 7, and 10, is a knife or cutter arranged transversely at the lower front edge of the guard M. The rear edges of the potato-cups pass in close proximity to this cutter, and in case a large potato is fed upon a cup said cutter severs the portion of the potato which overhangs the rear edge of the cup, thereby preventing clogging of the elevator. A similar cutter $p'$ is arranged immediately above and in front of the transverse cutter $p$ and at right angles thereto. This longitudinal cutter is arranged on that side of the path of the potato-cups opposite the guard $o$. A large potato upon encountering the guard $o$ is shifted toward the opposite side of the cup by this guard, and the overhanging portion of the potato is intercepted by the longitudinal cutter $p'$ and severed from the remaining portion of the potato.

$q$ is a fertilizer-hopper arranged on one side of the elevator I and having a discharge-spout $q'$, which extends downwardly to a point opposite the discharge-spout $j^2$ of the rear elevator-leg $j'$ and which is inclined toward said spout, so as to deliver the fertilizer into the furrow made by the plow D. As shown in Fig. 9, the fertilizer-hopper is provided in its bottom with a transverse discharge slot or passage $r$, and in this passage is located a series of delivery-wheels $r'$, which are arranged closely together and secured to the transverse shaft $k^3$, so as to turn therewith, as shown in Fig. 8. The delivery-wheels $r'$ are separated by annular flanges $r^2$, and each wheel is provided in its periphery with a number of pockets $r^3$, which receive a charge of fertilizer upon arriving under the discharge-passage of the fertilizer-hopper and which discharge the same into the spout $q'$. Each of the delivery-wheels is preferably provided with four equidistant pockets, as shown in Fig. 9, and the pockets of adjacent wheels are arranged out of line or set successively one in advance of the another, as shown in Fig. 4, so that the wheels together deliver a practically continuous stream of fertilizer instead of intermittent charges thereof, as is the case when the pockets of all the delivery-wheels are in line with each other. The fertilizer-hopper $q$ is provided in its bottom above each delivery-wheel $r'$ with an individual transverse gate or slide $s$, so that the discharge-passage $r$ can be closed above one or more of the wheels for discharging a greater or less quantity of fertilizer, as desired. These slides are provided with suitable handles, which pass through the rear wall of the fertilizer-hopper.

$t$, Figs. 2 and 8, is an upright shaft arranged centrally in the fertilizer-hopper $q$ and journaled in bridge-trees $t'$, arranged in said hopper. This shaft is provided at different levels with radial arms or stirrers $t^2$, which agitate and loosen the fertilizer and insure an unobstructed flow of the same from the hopper. The stirrer-shaft $t$ is driven from the upper elevator-shaft by bevel-gears $t^3\ t^4$. The top of the elevator-casing J is preferably open to expose the elevator-cups and enable the driver on the seat B' to observe whether or not the machine is operating properly.

The operation of our improved machine is as follows: The plow D, the covering-shovels E, and the presser-roller F are lowered to their operative position by means of the hand-lever G, and the feed-gate $h^2$ of the potato-hopper is opened to allow the potatoes to fall into the discharge-spout $h'$ of said hopper, as shown in Fig. 6, the pivoted bottom board $h$ of the hopper being vibrated from time to time by the lever $h^5$ to assist the discharge of the potatoes. The discharged potatoes fall upon the elevator-cups $i$, which ascend through the spout $h'$, and are temporarily held thereon by the impaling-pins $l$. The potatoes are individually elevated by their cups until they reach the top of the elevator, when the impaling-pins recede from the cups, allowing the potatoes to drop upon the curved upper portion of the guard M, whence they slide rearwardly on said guard until they are arrested and supported by the rear side of the arm $l^2$ of the next succeeding impaling-pin, as shown in Fig. 6. The released potatoes on the descending side of the elevator descend by gravity until they reach the discharge-spout $j^2$ of the elevator, when the pin-arms $l^2$ clear the latter and allow the potatoes to drop into the furrow made by the plow D. The potatoes are in this manner discharged one at a time and at regular intervals, thereby planting the same at uniform intervals. At the same time a quantity of fertilizer is dropped into the furrow by the delivery-wheels $r'$. Immediately after a potato has been dropped the shovels E cover the displaced earth over the same and the fertilizer and the presser-roller F packs down the earth.

By arranging the plow directly under the axle C or between the ground-wheels, as shown, the same descends into hollows of the ground and passes over knolls with the wheels, thus insuring the proper planting of the potatoes on undulating as well as level ground. By pivoting the supporting-arms $e$ of the covering-shovels to the front portion of the main frame independently of the plow they are capable of following the undulations of the ground and the potatoes are properly covered under all conditions.

We claim as our invention—

1. In a potato-planter, the combination with the main frame, of a potato-hopper, an elevator comprising a sprocket-chain and means for driving the same, and a series of narrow arms extending from said chain and having carrying-cups, a casing inclosing the chain, and a guard arranged between the chain and the cups, substantially as set forth.

2. In a potato-planter, the combination with the main frame and a potato-hopper mounted thereon, of an upright potato-elevator arranged in rear of said hopper and having cups or buckets arranged to receive the potatoes from said hopper, a casing inclosing said elevator, and a guard arranged in said casing on the inner side of said elevator-cups and extending upwardly in the front leg of said casing and thence rearwardly over said elevator and downwardly in the rear leg thereof, substantially as set forth.

3. In a potato-planter, the combination with the main frame and a potato-hopper mounted thereon, of an endless upright elevator chain or belt having its cups or buckets connected with the chain by projecting arms and arranged at one side of said arms, a casing inclosing said elevator chain and cups, and a guard projecting laterally from the inner side of said casing and arranged on the inner side of said cups, said guard extending upwardly in the front leg of said casing and thence rearwardly and downwardly in the rear leg thereof, substantially as set forth.

4. In a potato-planter, the combination with the main frame and a potato-hopper mounted thereon, of a potato-elevator having cups or buckets arranged to receive the potatoes from said hopper, and a stationary guard or projection arranged adjacent to the path of said cups, for intercepting and pushing superfluous potatoes from said cups, substantially as set forth.

5. In a potato-planter, the combination with an elevator chain or belt, of cups carried thereby and spaced therefrom, and a guard arranged between said cups and said elevator chain or belt to prevent the potatoes contacting with the chain or belt, said guard being provided at one end with a knife for cutting the potatoes, substantially as set forth.

6. In a potato-planter, the combination with the main frame and a potato-hopper mounted thereon, of a potato-elevator having cups or buckets arranged to receive the potatoes from said hopper, a guard arranged at one side of the path of said cups for shifting large potatoes laterally on the cups, and a cutter arranged at the opposite side of the path of the said cups for severing the overhanging portion of the potatoes, substantially as set forth.

7. In a potato-planter, the combination with the main frame and a potato-hopper mounted thereon, of a potato-elevator having cups or buckets arranged to receive the potatoes from said hopper, a guard arranged at one side of the path of said cups for shifting large potatoes laterally on the cups, a cutter arranged at the opposite side of the path of said cups for severing the overhanging portion of the potatoes, and a second cutter arranged at the rear side of the path of said cups, substantially as set forth.

8. The combination with a potato-hopper, of a carrier-chain passing around suitable guide-wheels, potato cups or buckets having bottom perforations and each rigidly secured to a link of said chain, an arm rigidly secured to a link of the chain adjacent to each link which carries a cup or bucket, and impaling-pins carried by said arms, said cups and arms being relatively movable toward and from each other to cause said pins to move into and out of said perforations by the reason of the different positions assumed by said chain-links in the travel of the chain, substantially as set forth.

9. In a potato-planter, the combination with the axle and the main frame, of a driving-gear and a loose guide-wheel on said axle, a transverse shaft arranged above the axle and provided with a guide-wheel and a driving-wheel, a potato-hopper, an elevator chain or belt running around the guide-wheels of said shaft and the axle and having cups or buckets arranged to receive the potatoes from said hopper, an intermediate shaft arranged between the axle and said first-named shaft and provided with a driving-wheel and a gear-wheel which meshes with the driving-wheel of the axle, and a chain or belt which runs around the driving-wheels of said upper and intermediate shafts, substantially as set forth.

10. In a potato-planter, the combination with the main frame and axle, of a vertically-swinging plow, a lifting device therefor, a potato-hopper mounted on the main frame, a potato-elevator geared with the axle, a clutch for throwing the elevator into and out of gear with the axle, and a lifting-link connecting the plow with the lifting device and having an offset portion for operating said clutch, substantially as set forth.

Witness our hands this 18th day of December, 1900.

JACOB JOHENGEN.
EDWARD A. FEDICK.

Witnesses:
  CARL F. GEYER,
  JNO. J. BONNER.